US00RE36496E

United States Patent [19]

Sutton

[11] E Patent Number: Re. 36,496

[45] Reissued Date of Patent: Jan. 18, 2000

[54] SKYLIGHT

[75] Inventor: Steven Michael Sutton, Oakhurst, Australia

[73] Assignee: Solatube International, Inc., Carlsbad, Calif.

[21] Appl. No.: 08/220,001

[22] Filed: Mar. 29, 1994

Related U.S. Patent Documents

Reissue of:

[64] Patent No.: 5,099,622
Issued: Mar. 31, 1992
Appl. No.: 07/275,398
Filed: Nov. 22, 1988

[51] Int. Cl.[7] ..... E04B 7/18

[52] U.S. Cl. ..... 52/200; 52/22

[58] Field of Search ..... 52/200, 22, 623; 126/696, 704

[56] References Cited

U.S. PATENT DOCUMENTS

| | | | |
|---|---|---|---|
| 191,802 | 6/1877 | Howard . | |
| 668,404 | 2/1901 | Hannenborg . | |
| 2,875,710 | 3/1959 | Bechtold . | |
| 3,012,375 | 12/1961 | Wasserman | 52/200 X |
| 3,090,613 | 5/1963 | Bechtold . | |
| 3,709,583 | 1/1973 | Pfannkuch et al. . | |
| 3,839,949 | 10/1974 | Gobel | 52/200 X |
| 4,114,186 | 9/1978 | Dominguez | 362/35 |
| 4,193,390 | 3/1980 | Hatten . | |
| 4,197,682 | 4/1980 | Schiff et al. . | |
| 4,280,480 | 7/1981 | Raposo | 126/430 X |
| 4,306,769 | 12/1981 | Martinet . | |
| 4,339,990 | 7/1982 | Freeman | 52/200 |
| 4,409,767 | 10/1983 | Jentoft et al. . | |
| 4,428,358 | 1/1984 | Adamson | 52/200 X |
| 4,429,952 | 2/1984 | Dominguez . | |
| 4,463,410 | 7/1984 | Mori . | |
| 4,576,440 | 3/1986 | Worthington . | |
| 4,620,771 | 11/1986 | Dominguez | 350/264 X |
| 4,733,505 | 3/1988 | Van Dame | 52/22 |
| 4,809,468 | 3/1989 | Bareiss | 52/200 X |
| 4,916,872 | 4/1990 | Young | 52/200 |

FOREIGN PATENT DOCUMENTS

| | | | |
|---|---|---|---|
| 2207585 | 8/1973 | Germany | 52/200 |
| 0647424 | 2/1979 | U.S.S.R. | 52/200 |
| 968254 | 10/1982 | U.S.S.R. . | |
| 977642 | 11/1982 | U.S.S.R. . | |
| 1434053 | 10/1988 | U.S.S.R. . | |

*Primary Examiner*—Christopher T. Kent
*Attorney, Agent, or Firm*—Gray Cary Ware & Freidenrich LLP; Lisa A. Haile

[57] ABSTRACT

A skylight and method of constructing a skylight wherein the method comprises the steps of forming an opening in the roof and ceiling respectively of a housing having a cavity therebetween. A tubular skylight is then inserted into the opening. The tubular skylight has a transparent surface protruding throughout the ceiling and roof respectively to pass light therethrough. A reflector is located within the domed transparent surface protruding through the roof, and is angled such that it reflects light that would not have passed into the tubular skylight into same.

35 Claims, 13 Drawing Sheets

SKYLIGHT

Matter enclosed in heavy brackets [ ] appears in the original patent but forms no part of this reissue specification; matter printed in italics indicates the additions made by reissue.

The present invention related to skylights, and in particular, to a skylight which has an integral body and is easy to install.

Skylight systems are well known in situations where existing or new dwellings require further light than is received through windows or doors.

The most common form of skylight is to construct a frame, usually of either wood or metal, from the ceiling to the roofing panels. A clear material such as PERSPEX (Trade Mark) covers the opening in the ceiling and the opening in the roof.

This method of construction is not standardized as each separate installation is different. This tends to increase the average cost of installation per unit.

It is also the case that generally to obtain sufficient light from the skylight, the skylight has to be of a size which requires the removal of some sections of roof joist and roof battens which in turn changes the loading of the roof thereon. To overcome the problems associated with such construction, a structural analysis should be made of the renovations and possible further structural members may be required.

It is an object of the present invention to provide an improved skylight which substantially overcomes or ameliorates the abovementioned disadvantages.

According to one aspect of the present invention there is disclosed a method for constructing a skylight system, said method comprising first forming an opening in each of a roof and ceiling respectively of a house having a cavity therebetween, locating a tubular skylight in said cavity between the ceiling and the roof with both ends of said tube having a transparent surface protruding through the ceiling and the roof respectively, and securing the skylight into position, sealing the openings.

According to another aspect of the present invention there is disclosed a skylight comprising a tubular body closed at each ends with transparent surfaces thereon. Preferably a reflector unit is located in the surface protruding through the roof and is substantially shaped such that is bends about the vertical and horizontal axes and faces towards the direction of the sun's path.

Preferably, the internal surfaces of the skylight tube are coated for maximum transmission of light therethrough.

Figure 1:
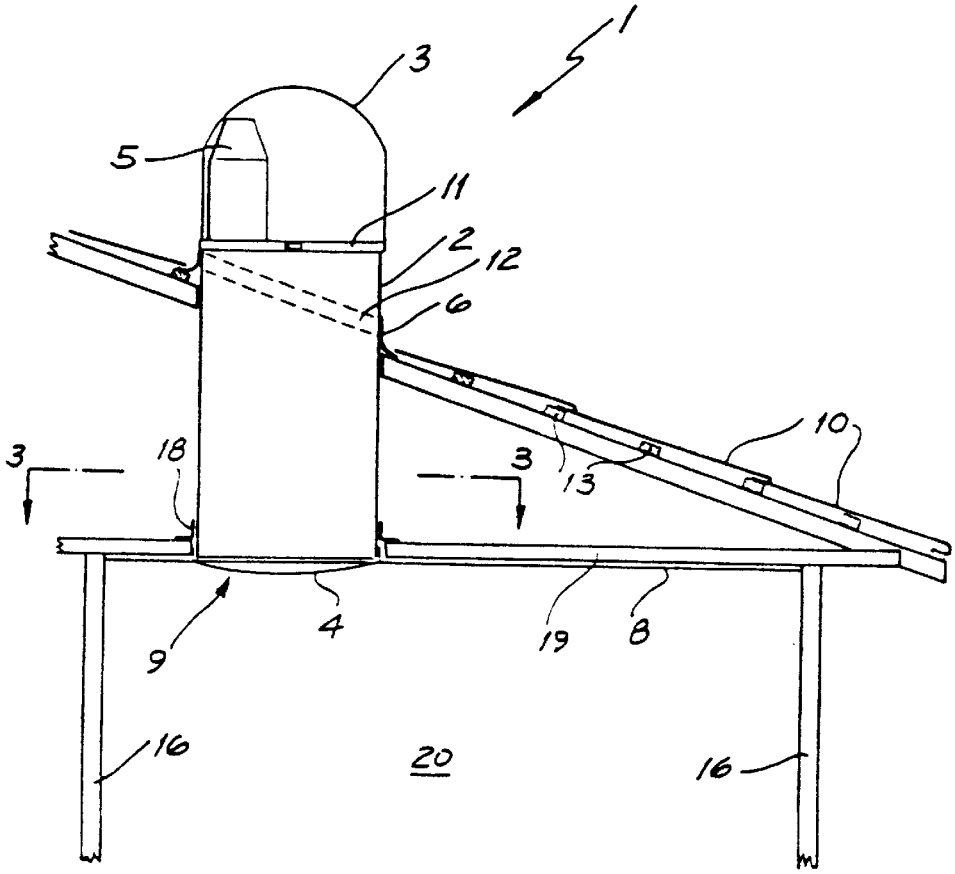
Figure 2:
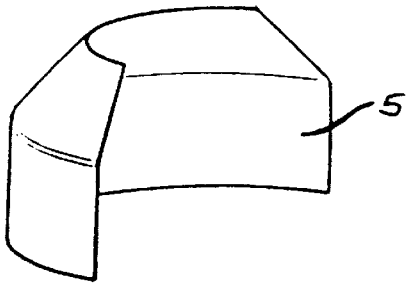
Figure 3:
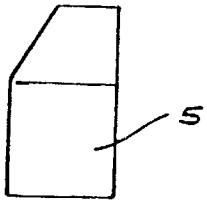
Figure 4:
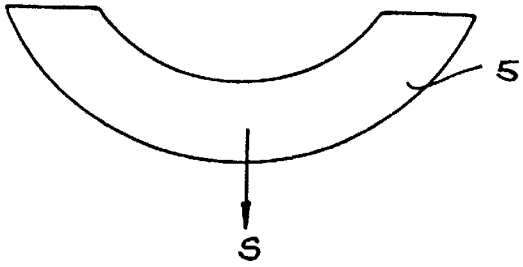
Figure 5:
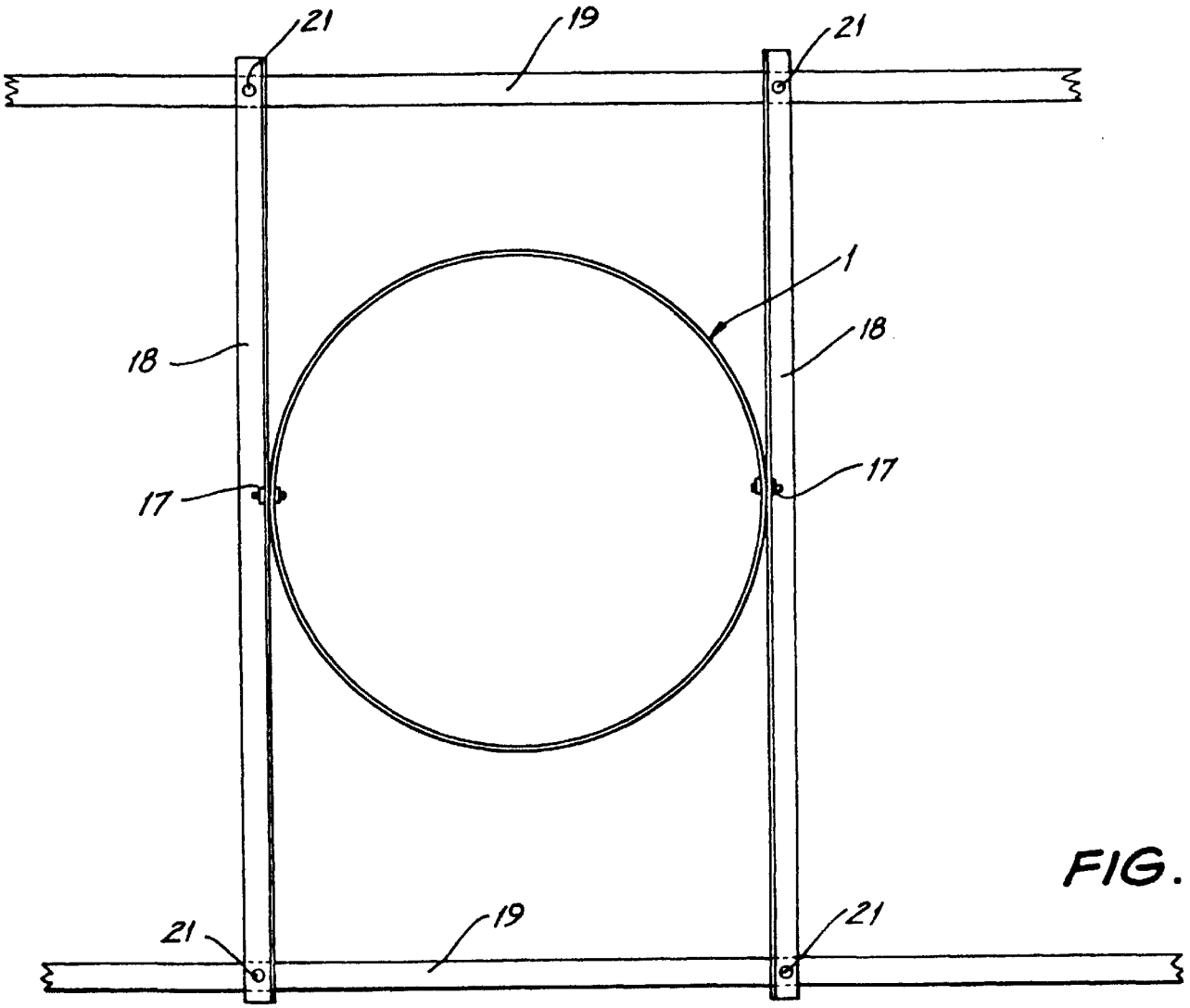
Figure 6:
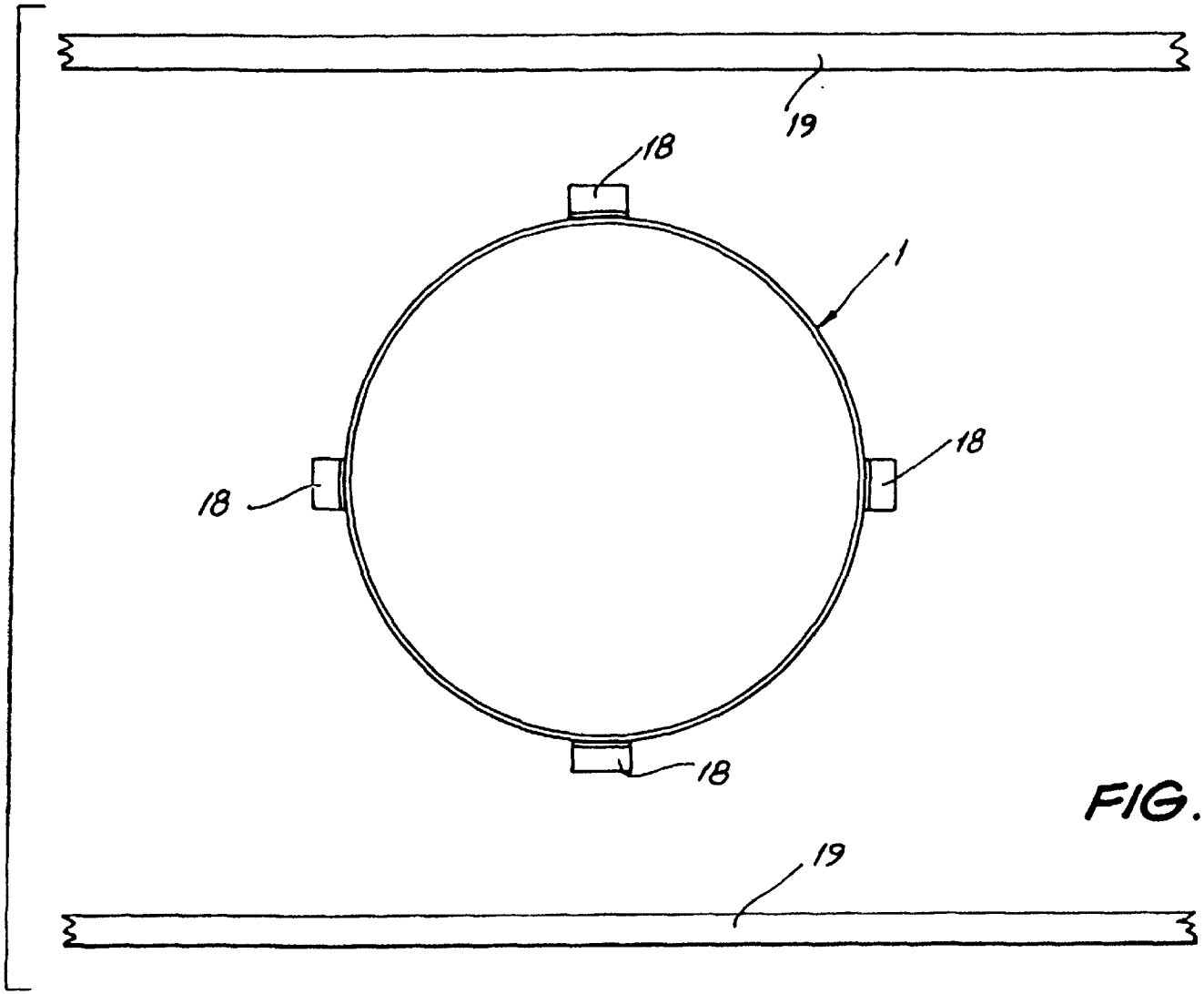
Figure 7:
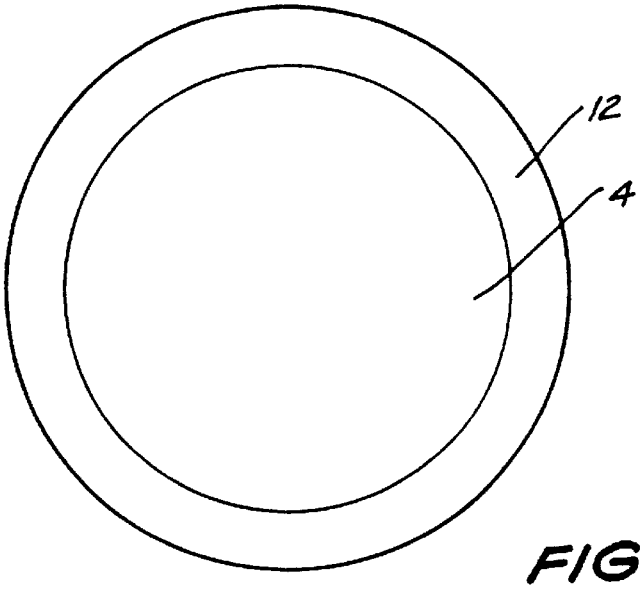
Figure 8:
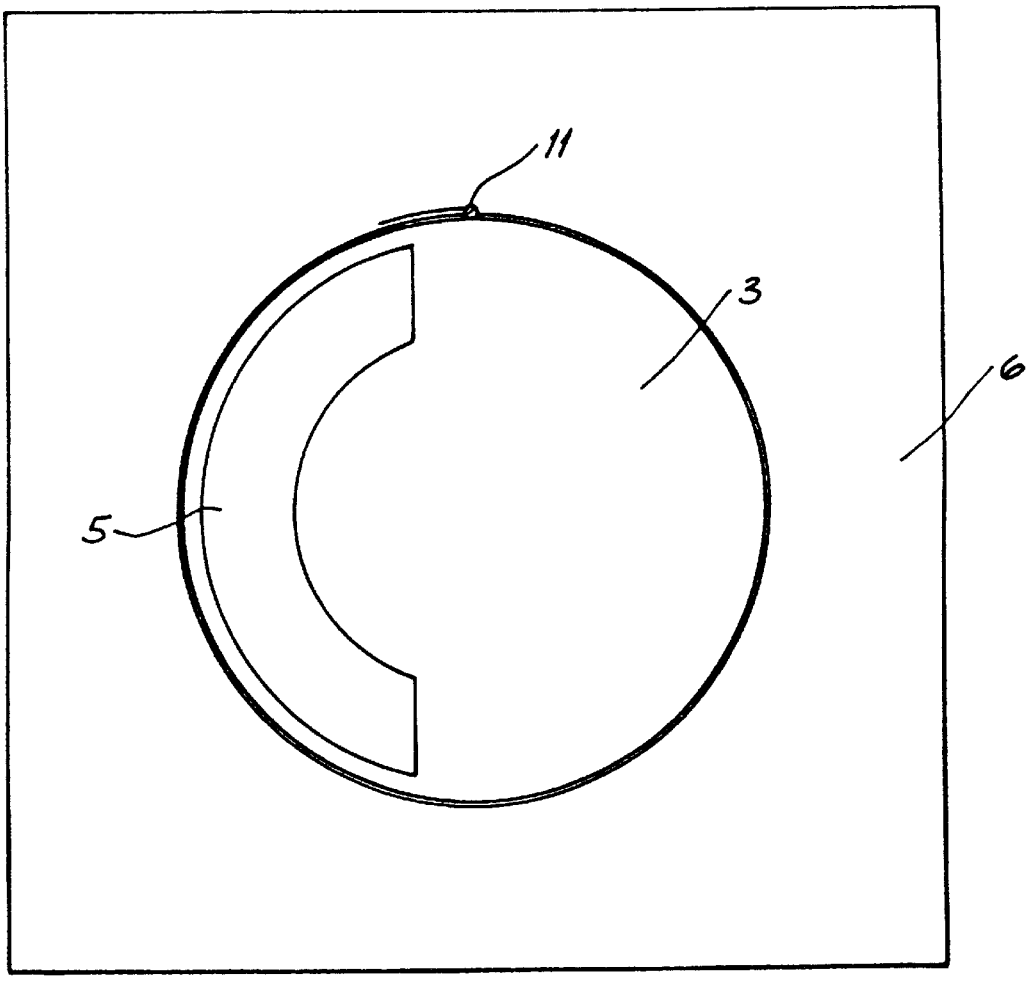
Figure 9:
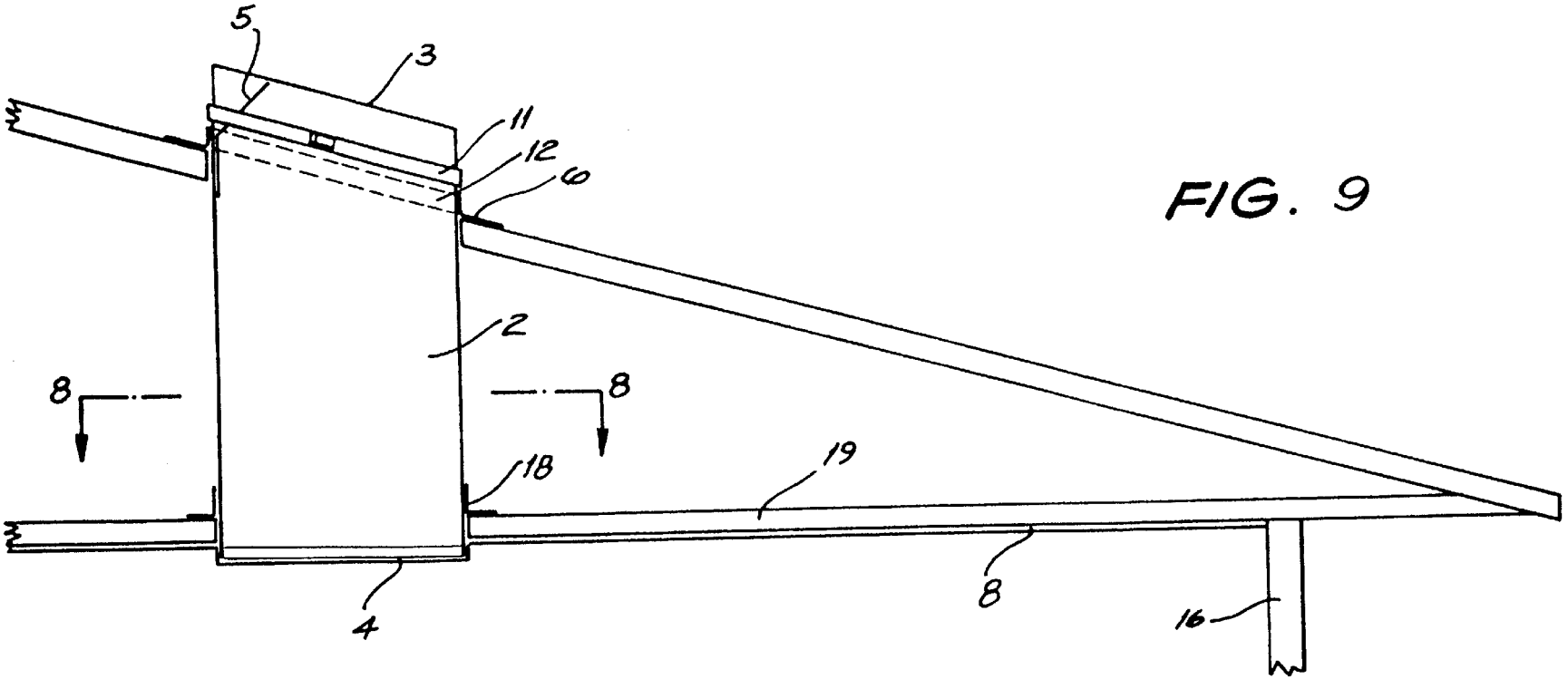
Figure 10:
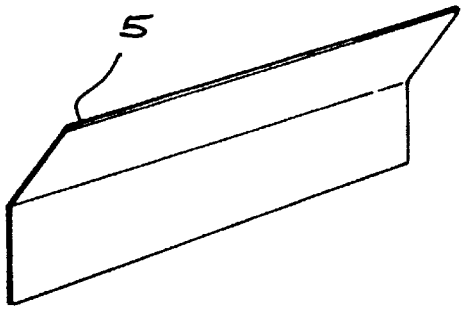
Figure 11:
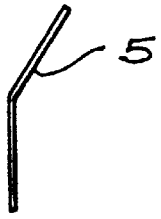
Figure 12:
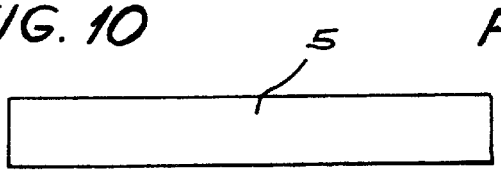
Figure 13:
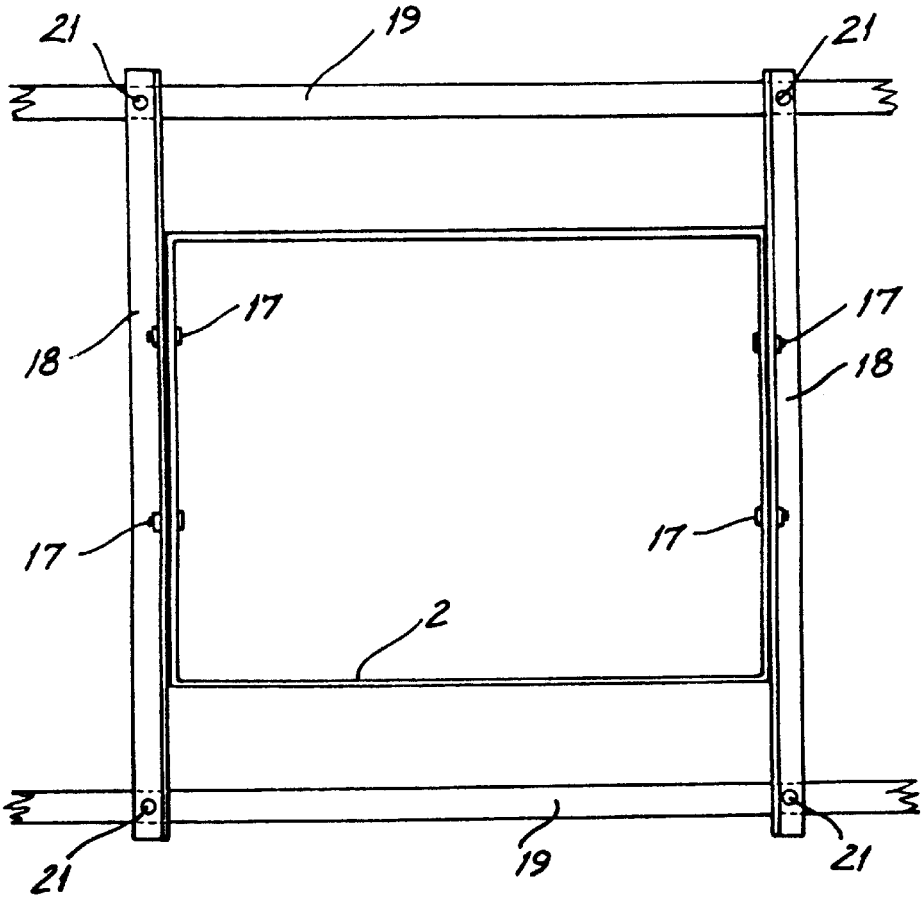
Figure 14:
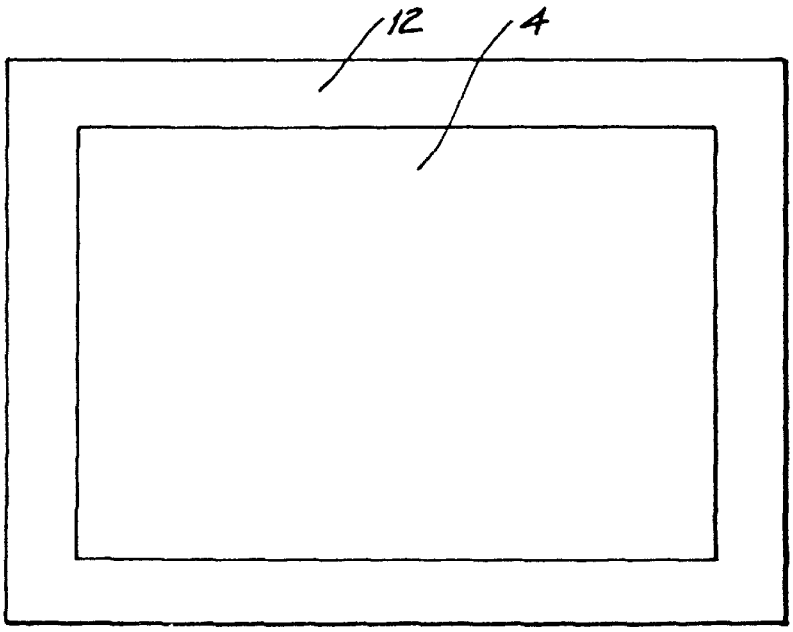
Figure 15:
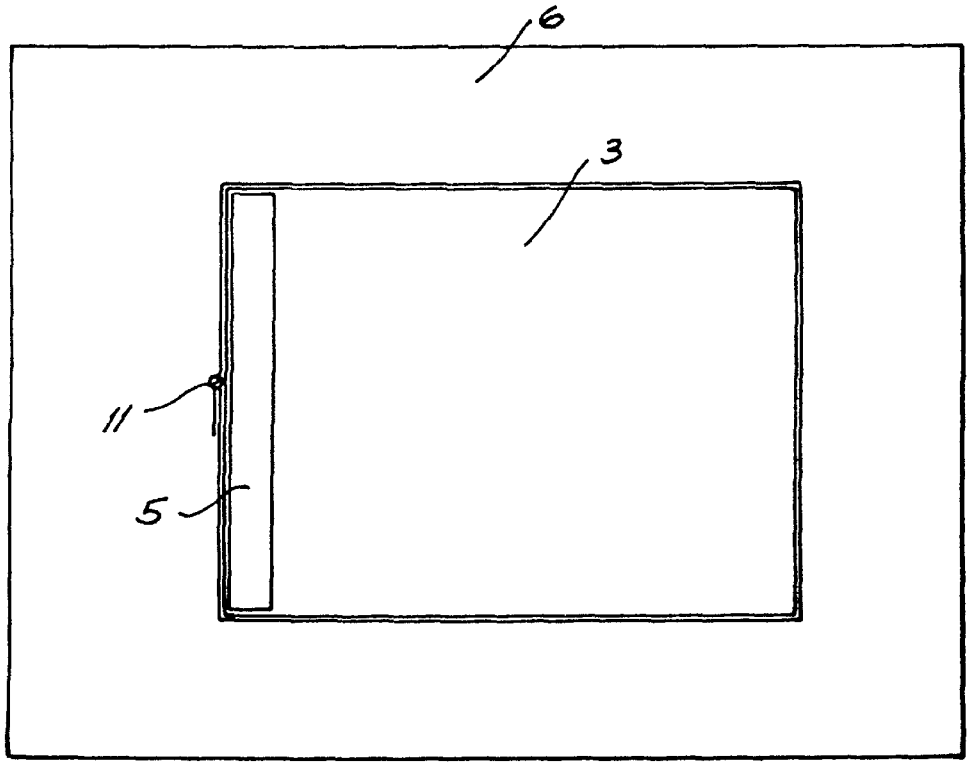
Figure 16:
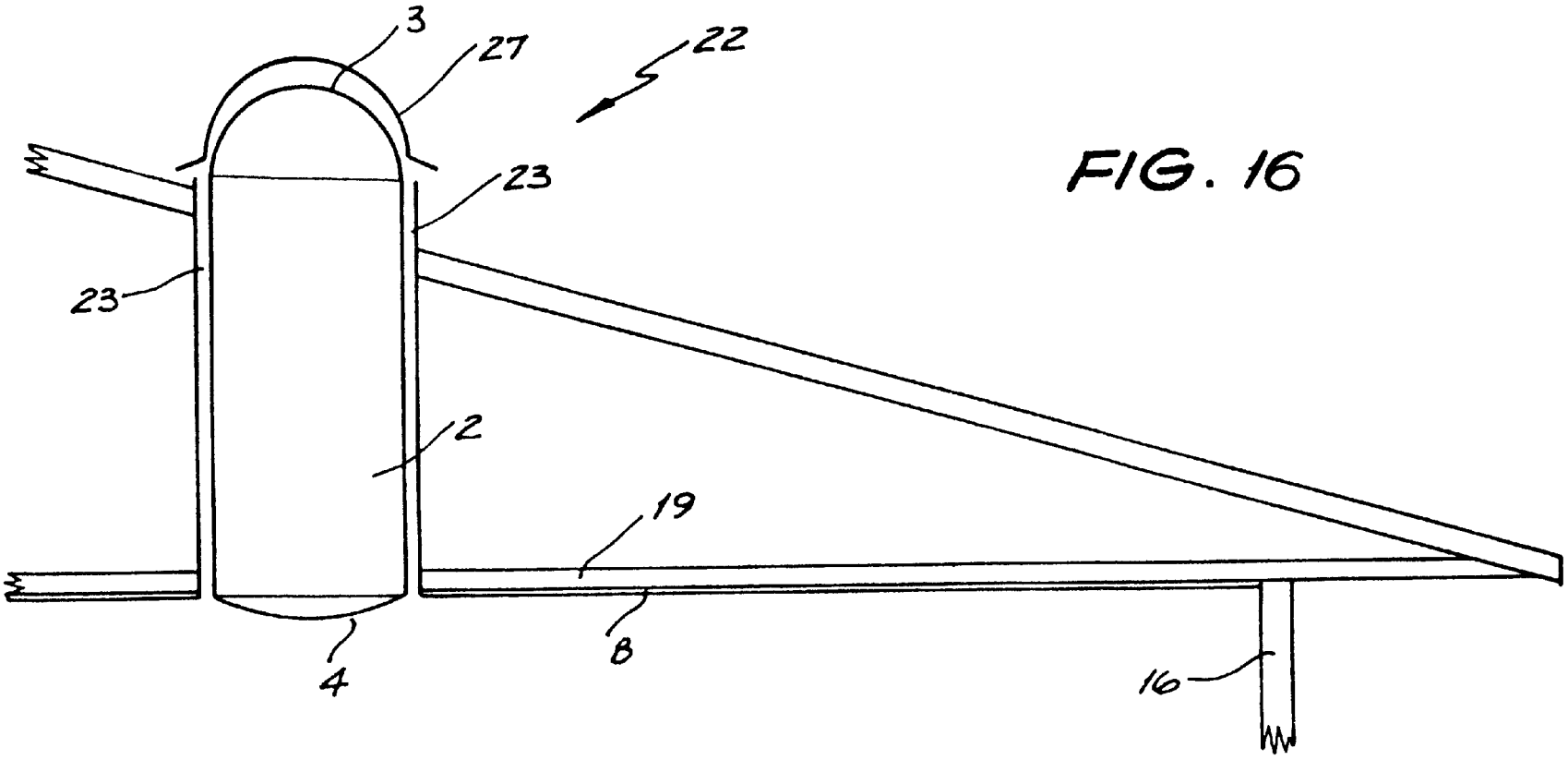
Figure 17:
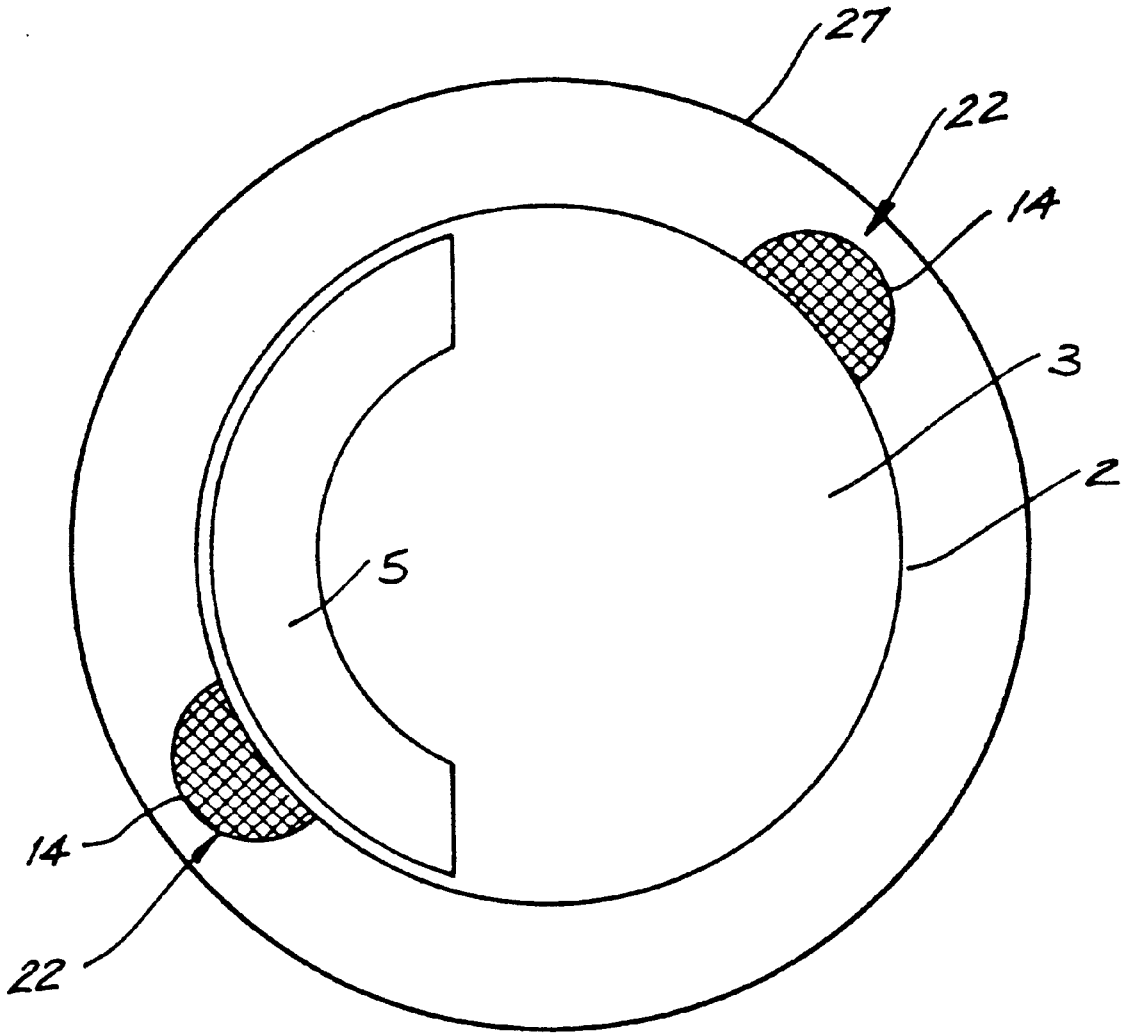
Figure 18:
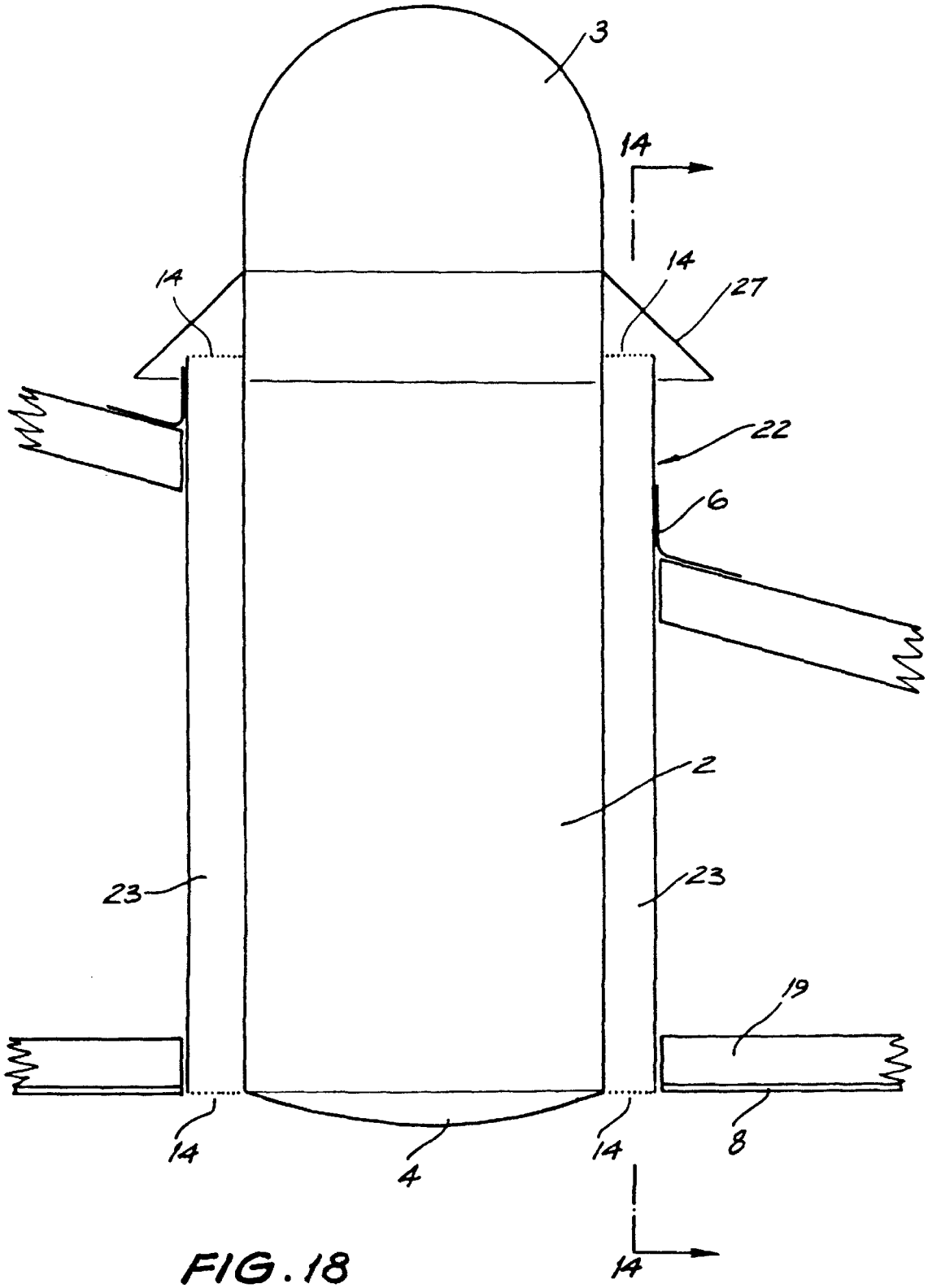
Figure 19:
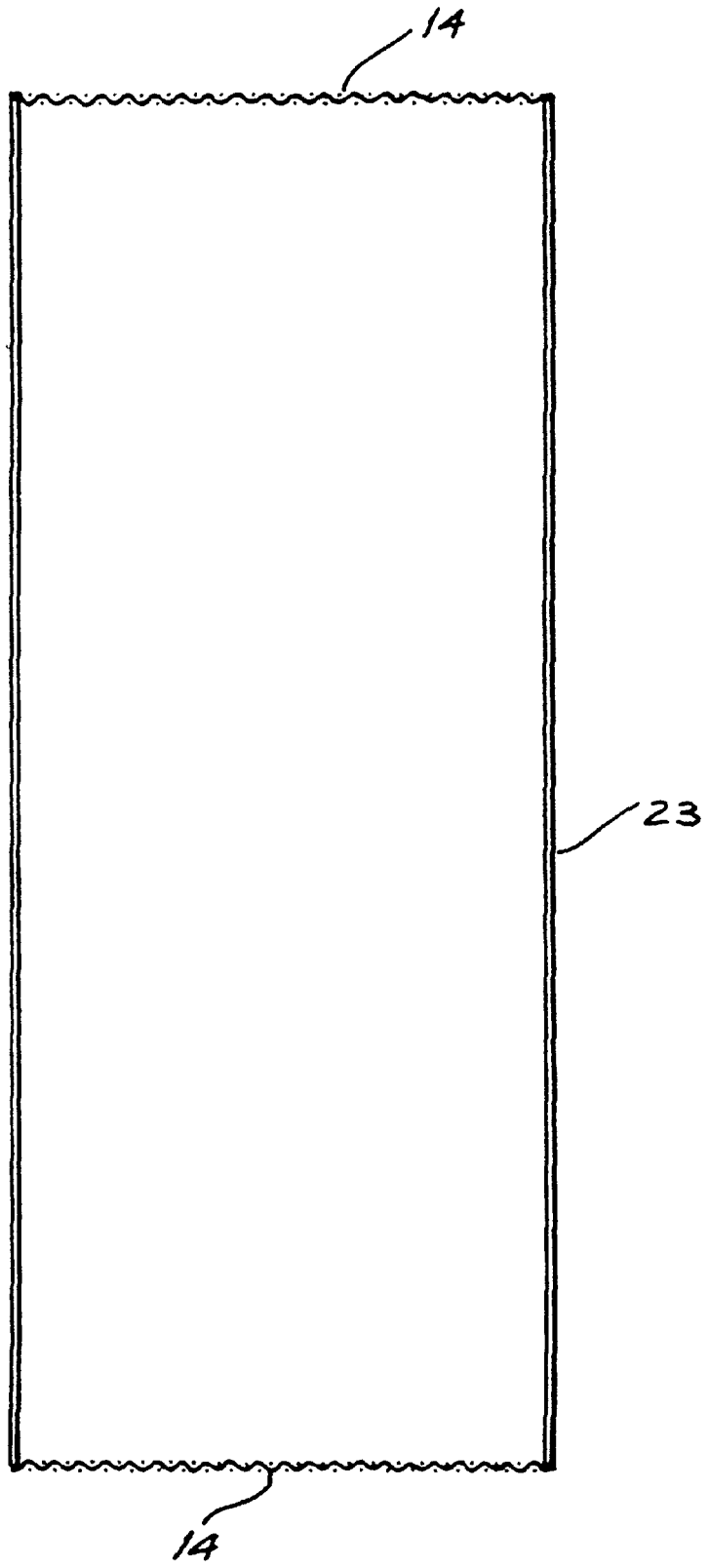
Figure 20:
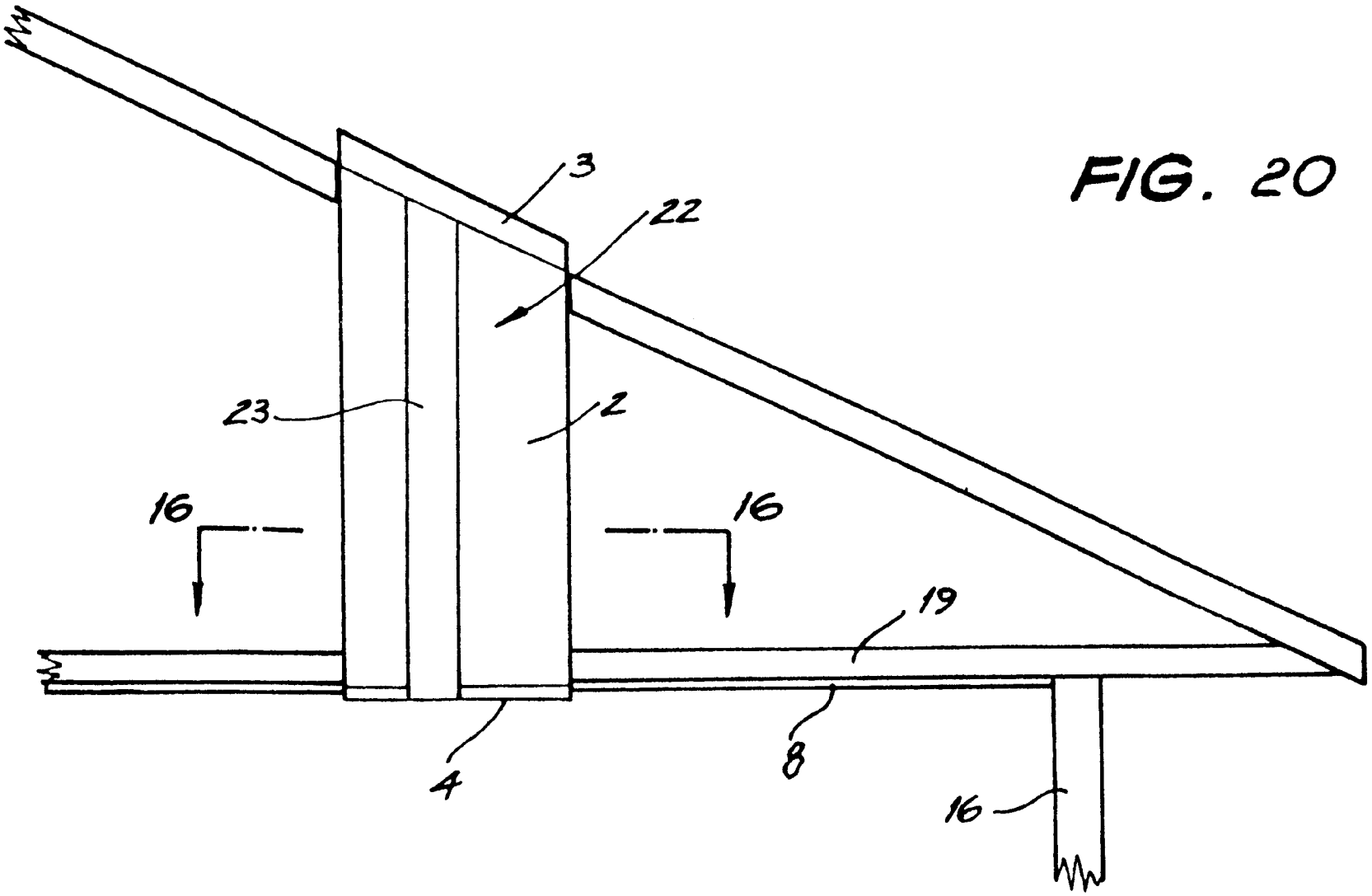
Figure 21:
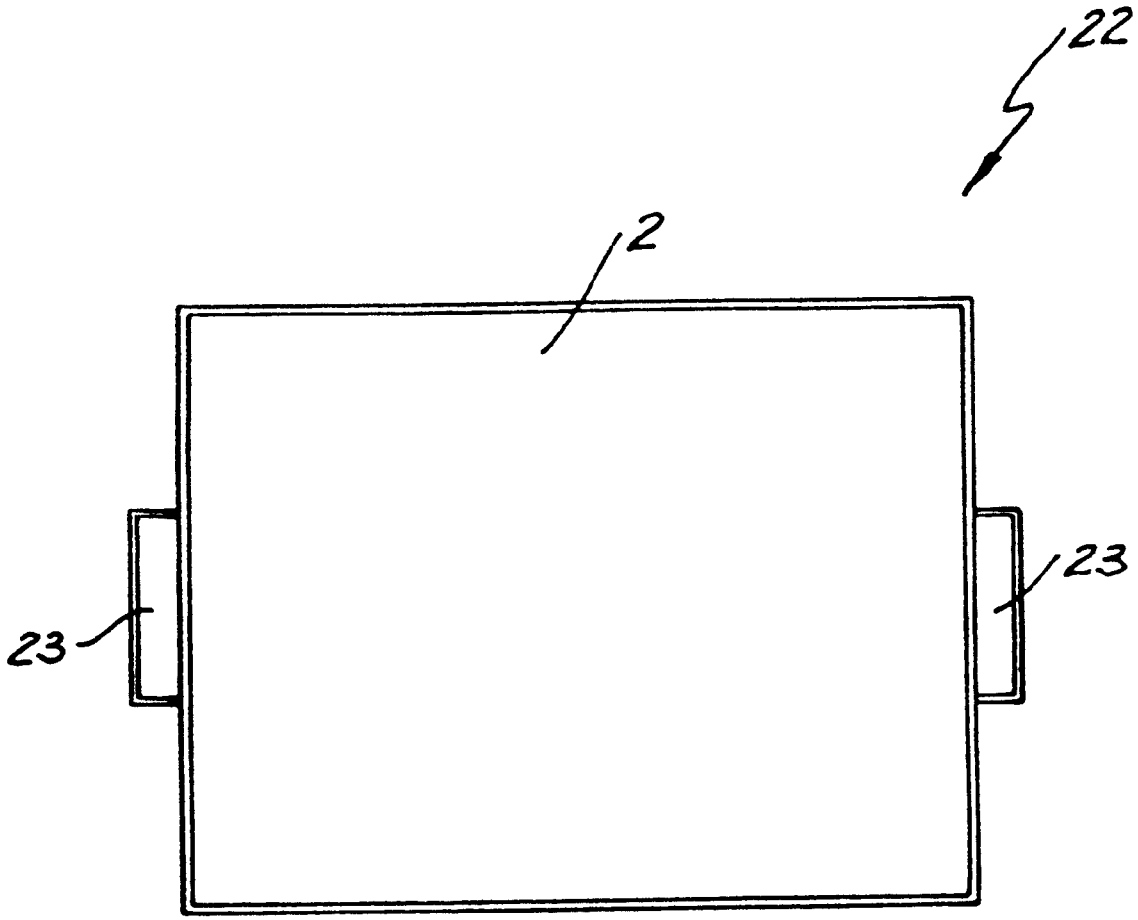

Some embodiment of the present invention will now be described with reference to the drawings in which:

FIG. 1 is a partial cut-away side view of an installed skylight according to a preferred embodiment, FIG. 2 is a perspective view of a reflector which is used in the skylight of FIG. 1, FIG. 3 is a side view of a reflector which is used in the skylight of FIG. 1, FIG. 4 is a top plan view of a reflector which is used in the skylight of FIG. 1, FIG. 5 is a plan view of a roof cavity showing support components for the installation of the skylight of FIG. 1, FIG. 6 is an exploded plan view of a roof cavity showing support components for the installation of the skylight of FIG. 1, FIG. 7 is an inverted plan view of the skylight of FIG. 1, FIG. 8 is a plan view of the installed skylight of FIG. 1, FIG. 9 is a partial cut-away side view of an installed skylight according to an alternate embodiment, FIG. 10 is a perspective view of a reflector to be used in the skylight as shown in FIG. 9, FIG. 11 is a side view of a reflector to be used in the skylight as shown in FIG. 9, FIG. 12 is a top plan view of a reflector to be used in the skylight as shown in FIG. 9, FIG. 13 is a plan view of the roof cavity showing support components for the skylight of FIG. 9, FIG. 14 is an inverted plan view of the skylight of FIG. 9, FIG. 15 is a plan view of the installed skylight of FIG. 9, FIG. 16 is a partial cut-away view of an installed skylight with optional venting according to another preferred embodiment, FIG. 17 is a plan view of the skylight of FIG. 16, FIG. 18 is a partial cut-away of an installed skylight with sectional indicator through optional venting of the skylight of FIG. 16, FIG. 19 is a cross-sectional view of the venting of FIG. 16, FIG. 20 is a partial cut-away view of an installed skylight with optional venting according to an alternate embodiment, and FIG. 21 is a plan view of the installed skylight with optional venting according to an alternate embodiment.

The skylight 1 of the preferred embodiment as illustrated in FIGS. 1 to 8 comprises a tube 2 which has one hemispherical end cap or upper bubble 3 and one dished or "bowter" end cap or diffuser 4 attached thereto.

The top end cap 3 is made of a clear PERSPEX (Trade Mark) or similar such material and the lower surface has a pattern impressed thereto forming a diffusing effect typical to K15 (Trade Mark). The top end cap or upper bubble 3 has a reflector 5 affixed thereto on its inside surface. The reflector 5 reflects the light that would otherwise pass through the sides of the upper bubble 3, into the tube 2 adding to the incident and transmitted through the tube 2.

The material of the tube 2 is either metal, fiber or plastics, and has a finish which is a highly reflective polish or coating, as found on "1150 alloy alluminium", electroplating, anodising or metalised plastic film. The coatings applied to all the internal surfaces thereof.

The highly reflective nature of the internal surfaces of the tube 2 assist in transmitting and reflecting light through the diffuser 4. The combined light passes through the diffuser 4 and is re-directed sideways and upwardly, which is then reflected off walls 16 and ceiling 8 and therefore creates indirect lighting for the room 20.

In the installation procedure, the position in the ceiling 8 is determined and a suitable hole 9 is cut out. The corresponding roof tiles 10 vertically above the hole 9 are also removed. It is noted at this point that some small portion of battens 13 may need to be removed depending on the positional requirements. The same applies to small and remediable portions of the roof structure.

Once the abovementioned has been noted, the tube 2 is then moved into position between the battens 13, and rested on the ceiling 8. Angle brackets 18 are fixed to the ceiling joist 19 with fasteners 21. The tube 2 is then lowered into the correct ceiling 8 level (flush with the underside of) which is automatically determined by aligning a bolt 17 with bracket 18 whereby the bolt 17 is affixed. This is associated with the embodiment of FIG. 6 whilst in the embodiment of FIG. 5 a plurality of tabs 18 rest on the ceiling 8.

Flashing 6 is then placed and dressed to the tube 2, and the roof tiles 10 are replaced. It should be noted that the flashing 6 placed under the roof tile 10 surrounding the tube 2. A hose clamp 11 is then fixed over the tube 2 and the upturn of the flashing 6 and a suitable water resistent sealant is applied therebetween.

The upper bubble 3 is then affixed, and is secured onto the tube 2 by a hose clamp 11. The reflector 5 has already been placed upon the top side of the tube 2 prior to installation.

The lower bubble or diffuser 4 is then affixed to the lower end of the tube 2 through the hole 9 provided in the ceiling 8. The diffuser 4 has a flange 12 or alternatively a dress trim. The diffuser 4 can have varying shapes as illustrated in FIGS. 1, 7, 9, 14, 16 and 18 as well as the upper bubble 3 having different shapes as illustrated in FIGS. 1, 7, 9, 16 and 20.

According to the different embodiments of the invention in the drawings, the reflector is illustrated in FIGS. 2, 3, 4, 10, 11 and 12.

After the skylight 1 has been installed, ambient, permeative, and direct sunlight from the sky enters the upper bubble 3, a large proportion of the light striking the reflector 5, the balance of the light that would normally pass through the clear material of the upper bubble 3 is reflected back into the tube 2 by means of the reflector 5 located at the elevation away from the sun of the upper bubble 3 which is fixed to the tube 2 between the external surface of the tube 2 and the internal surface of the upper bubble 3. This reflected light now enters the tube 2 at a corresponding and opposite angle to the light received through the upper bubble 3. The combination of the variability angled light strikes the diffuser 4 and the light scattered throughout the room 20.

As the skylight 1 is a sealed unit, dust ingress is prevented by the close fit of the upper bubble 3 with the tube 2 and correspondingly the close fit between the tube 2 and the diffuser 4. In a similar manner, pests are also prevented from entering into the skylight 1.

With regard to the thermal considerations, it is found that greater amounts of heat are found under skylighted areas in the summer time and conversely, less with the lower temperatures in winter. The present invention eliminates such problems due to the substantially sealed nature of the skylight 1. The beforementioned close fit of all the components prevents excess air movement which creates a static column of air within the skylight 1. The column of air acts as an insulator combined with the insulating properties of plastics forming the upper bubble 3 and diffuser 4 which prevents heat from entering the room 20. The heat that builds up within the skylight 1 is dissipated into the roof cavity via the conductive material of the tube 2.

Conversely, in a winter situation, it is found that heat rises, therefore the roof cavity would not be as cool as the external temperature prevailing on the outside of the building. The conductive material of the tube 2 would absorb some of the heat warming the air column within. As the air column is heated, it therefore follows that the skylight 1 acts as an insulator and maintains a substantial amount of heat within the room 20.

Another embodiment of the skylight 1 is illustrated in FIGS. 9 to 15. This embodiment illustrated comprises a skylight having a square or rectangular cross-section.

A method of venting the skylight 1 is illustrated in FIGS. 16 to 21. When the skylight 1 is vented, dust and pests are prevented from entering the skylight 1 by means of a fine metal fly screen 14.

Taking into consideration the thermal operation of a vented skylight 1, a venting system 22 has a vent tube 23 painted a substantially black colour which absorbs light. The light energy is converted into heat energy and the heat causes the air in the exposed portion of the vent assembly 24 to the top of the tube 2 to expand. The expanded air rises out of the vent assembly 24 causing the displacement of air and the displaced air is replaced by cooler air further down the vent tube 23 which subsequently originates from the room 20, thereby creating a constant airflow from the room 20 through to the outside.

A rain cover 27 is additionally supplied to the vent tube 23.

The main benefit of the skylights of the preferred embodiments is that the efficiency of the skylight enables the sky to have a smaller diameter/area than equivalent prior art skylights which provides for economy and speed of installation.

The foregoing describes only some embodiments of the present invention, and modifications obvious to those skilled in the art can be made thereto without departing from the scope of the present invention.

I claim:

1. A skylight system for a building having a roof and a ceiling spaced from said roof with a cavity therebetween, the skylight system comprising:

a tubular body *having a longitudinal axis* for positioning in said cavity, *said tubular body* having a first end and a second end;

a [first] transparent cover, attached to said first end of said body[, extending] *and to extend* above the roof [and] *for* forming a light-permeable chamber above the first end;

a [second transparent] *light-transmitting* cover, attached to said second end of said body, [located] *for location* at said ceiling; and a reflector, located *substantially laterally of said axis* within said light-permeable chamber [and extending] *to extend* above the roof, to reflect at least some light incident thereon into said body *that would not otherwise enter said body while permitting light to pass downwardly through the transparent cover into said body*.

2. A skylight system according to claim 1 wherein said body is internally coated with a highly reflective material.

3. A skylight system according to claim 1 wherein said [first] *transparent* cover is substantially convex in shape and said reflector is attached to said [first] *transparent* cover.

4. A skylight system according to claim 1 further comprising a plurality of tabs provided on [the] *an* outside of said body for abutting against said ceiling.

5. A skylight system according to claim 1 wherein[, in use,] said body is *adapted to be* secured to at least one cross member which is used to bridge between adjacent joints provided in the ceiling.

6. A skylight system according to claim 1 further comprising sealing means which seal said [first] *transparent* and [second] *light-transmitting* covers to said body to provide an air tight enclosure.

7. A skylight system according to claim [11] *1* further comprising a venting system communicating with said body for raising or lowering the temperature of the air in the skylight system.

8. A method of constructing a skylight system comprising the steps of:

forming an opening in each of a roof and a ceiling of a building having a cavity between said roof and ceiling;

positioning a tubular body, *having a longitudinal axis* in said cavity; and securing said body in position, said body having a first and a second end so that a [first] transparent cover, attached to said first end of said body, extends above the roof and forms a light-permeable chamber above said first end and a [second transparent] *light transmitting* cover is attached to said second end so as to be located at said ceiling, *and providing a reflector in* said light-permeable chamber [having a reflector located therein,] extending above said roof *laterally of said axis*, so as to reflect at least some light incident thereon into said body *that would not otherwise enter said body while permitting light to pass downwardly through the transparent cover into said body.*

9. A method of constructing a skylight system according to claim 8 wherein the step of positioning said body includes abutting a plurality of tabs provided on [the] *an* outside of said body against the ceiling.

10. A method of constructing a skylight system according to claim [18] *8* wherein said body is secured to at least one cross member which is used to bridge between adjacent [joists] *joints* provided in the ceiling.

11. A method of constructing a skylight system according to claim 8 further comprising the step of sealing said [first] *transparent* and [second] *light-transmitting* covers to said body to provide an air tight enclosure.

12. A method of constructing a skylight system according to claim 8 further comprising the step of coupling a venting system to said body for raising or lowering the temperature of the air in the skylight system.

*13. The skylight system of claim 1 wherein said light-transmitting cover is a diffuser.*

*14. The skylight system of claim 1 wherein said light-transmitting cover is adapted to protrude below the ceiling.*

*15. The method of claim 8 wherein said light-transmitting cover is a diffuser.*

*16. The method of claim 8 wherein said light-transmitting cover is positioned so as to protrude below said ceiling.*

*17. A skylight for a building having a roof and a ceiling spaced from said roof with a cavity therebetween, said skylight comprising:*

*a tubular body for positioning in said cavity, said tubular body, having a longitudinal axis and first and second ends;*

*a transparent cover, attached to said first end of said body and to extend above the roof for forming a light-permeable chamber above said first end; and*

*a reflector, located substantially laterally of said axis of said body within said light-permeable chamber and to extend above the roof, to reflect at least some light incident thereon into said body that would not otherwise enter said body while permitting light to pass downwardly through the transparent cover into said body.*

*18. A skylight as claimed in claim 17, wherein said light permeable chamber is surrounded by said transparent cover and said reflector projects within said transparent cover into the light permeable chamber to reflect incident light thereon traveling across and through the transparent cover.*

*19. A skylight system as claimed in claim 1, wherein said light permeable chamber is surrounded by said transparent cover and said reflector projects within said transparent cover into the light permeable chamber to reflect incident light thereon traveling across and through the transparent cover.*

*20. A method as claimed in claim 8, comprising locating said reflector in said light permeable chamber above said roof and projecting within said transparent cover to reflect incident light thereon traveling across and through the transparent cover.*

*21. A skylight as claimed in claim 18, wherein said reflector projects beyond said first end of said body into said light permeable chamber.*

*22. A skylight as claimed in claim 19, wherein said reflector projects beyond said first end of said body into said light permeable chamber.*

*23. A method as claimed in claim 20, comprising locating said reflector to project beyond said first end of said tubular body into said light-permeable chamber.*

*24. The skylight system of claim 1, wherein said reflector is arcuate and extends angularly around said axis in radially spaced relation therefrom.*

*25. The skylight system of claim 17, wherein said reflector is arcuate and extends angularly around said axis in radially spaced relation therefrom.*

*26. The method of claim 8, wherein said reflector is arcuate and extends angularly around said axis in radially spaced relation therefrom.*

*27. The method of claim 11, wherein said reflector is arcuate and extends angularly around said axis in radially spaced relation therefrom.*

*28. The skylight system of claim 17, wherein said body is internally coated with a highly reflective material.*

*29. The method of claim 8, comprising providing a highly reflective material on an internal surface of said tubular body.*

*30. A skylight system for a building having a roof and a ceiling spaced from said roof with a cavity therebetween, the skylight system comprising:*

*a tubular body having a longitudinal axis for positioning in said cavity, said tubular body having a first end and a second end, and a constant radius along said axis;*

*a transparent cover, attached to said first end of said body and to extend above the roof for forming a light-permeable chamber above said first end;*

*a light-transmitting cover, attached to said second end of said body, for location at said ceiling; and*

*a reflector, located substantially laterally of said axis within said light-permeable chamber to extend above the roof, to reflect at least some light incident thereon into said body that would not otherwise enter said body while permitting light to pass downwardly through the transparent cover into said body.*

*31. A method of constructing a skylight system comprising the steps of:*

*forming an opening in each of a roof and a ceiling of a building having a cavity between said roof and ceiling;*

*positioning a tubular body, having a longitudinal axis and a constant radius along said axis, in said cavity; and*

*securing said body in position, said body having a first and a second end so that a transparent cover, attached to said first end of said body, extends above the roof and forms a light-permeable chamber above said first end and a light transmitting cover is attached to said second end so as to be located at said ceiling, and providing a reflector in said light-permeable chamber extending above said roof laterally of said axis, so as to reflect at least some light incident thereon into said body that would not otherwise enter said body while permitting light to pass downwardly through the transparent cover into said body.*

*32. A skylight for a building having a roof and a ceiling spaced from said roof with a cavity therebetween, said skylight comprising:*

*a tubular body for positioning in said cavity, said tubular body, having a longitudinal axis and a constant radius along said axis, and first and second ends;*

*a transparent cover, attached to said first end of said body and to extend above the roof for forming a light-permeable chamber above said first end; and*

*a reflector, located substantially laterally of said axis of said body within said light-permeable chamber and to extend above the roof, to reflect at least some light incident thereon into said body that would not otherwise enter said body while permitting light to pass downwardly through the transparent cover into said body.*

*33. A skylight system for a building having a roof and a ceiling spaced from said roof with a cavity therebetween, the skylight system comprising:*

*a tubular body having a longitudinal axis for positioning in said cavity, said tubular body having a first end and a second end;*

*a transparent cover, attached to said first end of said body and to extend above the roof for forming a light-permeable chamber above said first end wherein said transparent cover has an axis that is aligned with the longitudinal axis of said tubular body;*

*a light-transmitting cover, attached to said second end of said body, or location at said ceiling; and*

*a reflector located substantially laterally of said axis within said light-permeable chamber to extend above the roof, to reflect at least some light incident thereon into said body that would not otherwise enter said body while permitting light to pass downwardly through the transparent cover into said body.*

*34. A method of constructing a skylight system comprising the steps of:*

*forming an opening in each of a roof and a ceiling of a building having a cavity between said roof and ceiling;*

*positioning a tubular body, having a longitudinal axis in said cavity; and*

*securing said body in position, said body having a first and a second end so that a transparent cover, attached to said first end of said body extends above the roof and forms a light-permeable chamber above said first end, wherein said transparent cover has an axis that is aligned with the longitudinal axis of said tubular body, and a light transmitting cover is attached to said second end so as to be located at said ceiling providing a reflector in said light-permeable chamber extending above said roof laterally of said axis so as to reflect at least some light incident thereon into said body that would not otherwise enter said body while permitting light to pass downwardly through the transparent cover into said body.*

*35. A skylight for a building having a roof and a ceiling spaced from said roof with a cavity therebetween, said skylight comprising:*

*a tubular body for positioning in said cavity, said tubular body having a longitudinal axis and first and second ends;*

*a transparent cover, attached to said first end of said body and to extend above the roof for forming a light-permeable chamber above said first end, wherein said transparent cover has an axis that is aligned with the longitudinal axis of said tubular body; and*

*a reflector located substantially laterally of said axis of said body wherein said light-permeable chamber and to extend above the roof, to reflect at least some light incident thereon into said body that would not otherwise enter said body while permitting light to pass downwardly through the transparent cover into said body.*

* * * * *